United States Patent [19]

Bennett et al.

[11] Patent Number: 4,679,657
[45] Date of Patent: Jul. 14, 1987

[54] MOBILE TANK VEHICLE ACCESS SYSTEM

[75] Inventors: Ronald W. Bennett, Florence; Ellie H. MacDonald, Timmonsville, both of S.C.

[73] Assignee: Aluminum Ladder Company, Florence, S.C.

[21] Appl. No.: 821,805

[22] Filed: Jan. 23, 1986

[51] Int. Cl.[4] .......................... E04G 1/26; E04G 1/28
[52] U.S. Cl. ................................. 182/113; 182/131; 182/106; 182/1
[58] Field of Search .................. 182/1, 106, 113, 129, 182/137, 127, 131

[56] References Cited

U.S. PATENT DOCUMENTS

| 862,152 | 8/1907 | German | 182/47 |
| 1,113,446 | 10/1914 | Kline | 182/111 |
| 2,095,392 | 10/1937 | Marschke | 182/78 |
| 3,949,834 | 4/1976 | Nusbaum | 182/138 |
| 4,013,140 | 3/1977 | Pradon | 182/1 |
| 4,371,056 | 2/1983 | Anglade | 182/127 |
| 4,572,328 | 2/1986 | Benko | 182/1 |

Primary Examiner—Reinaldo Machado
Attorney, Agent, or Firm—Harvey B. Jacobson

[57] ABSTRACT

An elevated platform is provided including one longitudinal marginal portion alongside which an elongated tank body of a vehicle may be disposed. The marginal portion of the platform pivotally mounts a pair of extension panels therefrom in slightly spaced relation therealong for movement between raised inoperative positions and downwardly and outwardly inclined operative positions and a step ramp has one end pivotally mounted from the platform between the panels for swinging movement between a raised inoperative position and a downwardly and outwardly inclined inoperative position. The outer margins of the panels and the outer end of the step ramp are generally coterminous when in the operative positions for engagement with and support from the near side of the top of a tank body and an upstanding railing assembly is swingably mounted from the platform and positionable for engaging and the support from the far side of the top of a tank body with which the panels and the ramp are engaged. Each of the panels, the ramp and the railing structure are independently swingable between the operative and inoperative positions thereof.

11 Claims, 6 Drawing Figures

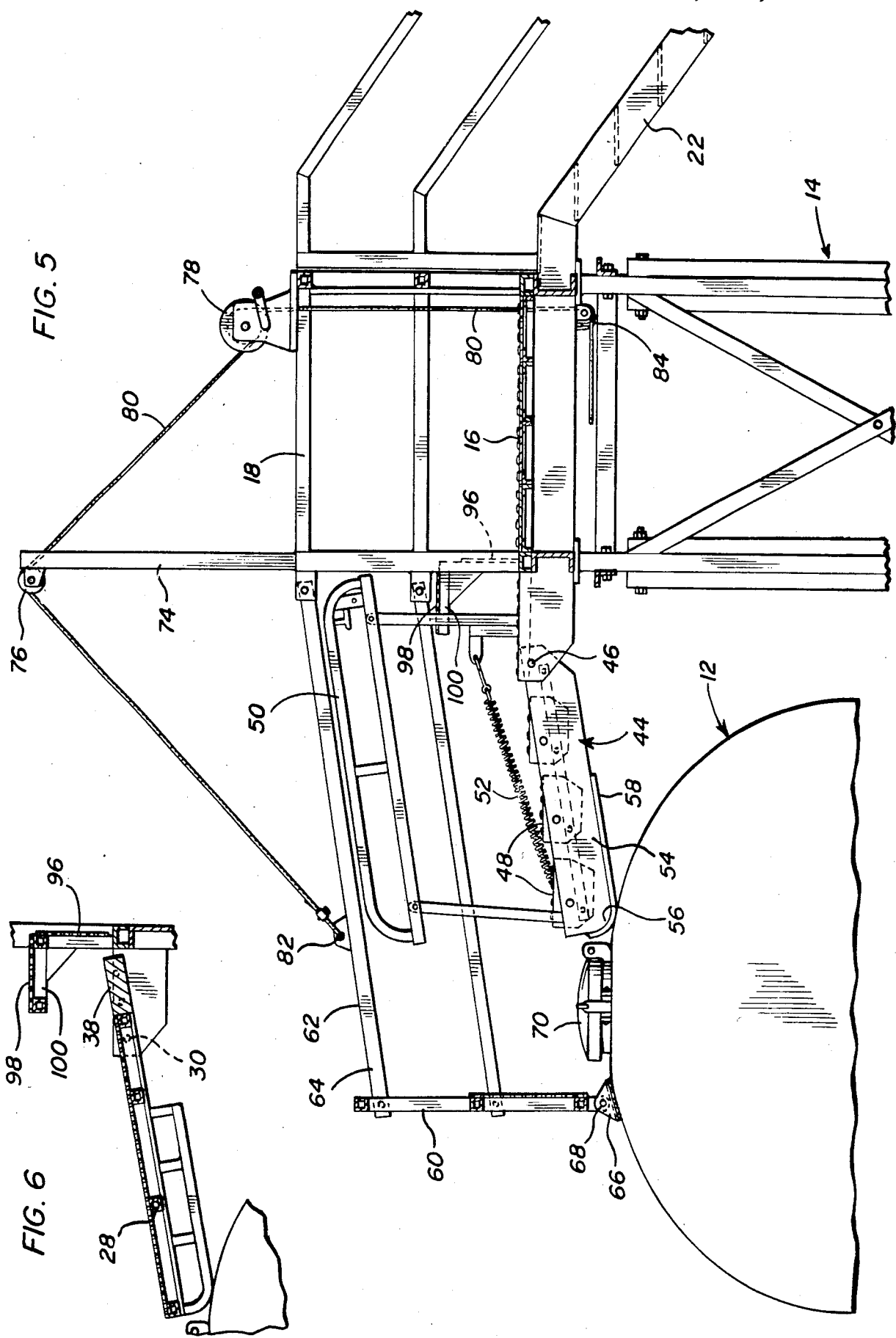

4,679,657

MOBILE TANK VEHICLE ACCESS SYSTEM

BACKGROUND OF THE INVENTION

1. Field of the Invention

This invention relates to an access system mounted from an elevated platform along which an elongated mobile tank may be disposed and the access system incorporates extension panel structure for effectively extending the platform outwardly over the near side of the tank and an elongated railing structure supported from the platform for extension therefrom to a position disposed outward of the extension panel structure, extending along and supported from the remote side of the tank. The spacing between the extension panel structure and the railing structure being provided for receiving central tank interior access means carried by the tank therebetween.

Subject matter pertinent to the instant invention is classified in Class 182, subclasses 86, 106, 112, 113, 129, 131, 137 and 179.

2. Description of Related Art

Various different forms of extensions, safety railings, other safety devices and shields including some of the general structural and operational features of the instant invention are disclosed in U.S. Pat. Nos. 862,152, 3,949,834, 4,013,140 and 4,371,056.

The safety equipment disclosed in U.S. Pat. No. 4,013,140 is deemed to be more pertinent to the instant invention than the other above noted patents in that it discloses hinged platform extensions and the steps as well as parallelagram linkage supported railing structure. However, these swingable components are all interconnected for substantially simultaneous swing between raised retracted positions and the lowered extended positions. Although counterbalancing structures are provided to assist in swinging the various components to the raised inoperative positions, such counterbalance structures do not remain effective under a reasonably heavy snow or ice load and the swingable components are therefore very difficult to raise under such a load. With the instant invention the extension panels, access ramp or steps and railing structure are independently swingably supported from the associated platform and different means is provided for swinging each toward the raised inoperative position thereof.

SUMMARY OF THE INVENTION

The access system of the instant invention includes an elevated Platform and a pair of elongated longitudinally spaced apart and hingedly supported extension panels mounted from the platform and which may be swung between raised inwardly retracted inoperative positions and lowered outwardly projecting operative positions with their free marginal edges resting against the near side of the upper portion of an elongated tank disposed along the platform. In addition, a railing structure is supported from the platform for swinging between a raised inoperative position and a lowered horizontally outwardly displaced position for support from the far side of the top of the associated tank and the spacing between the extension panels is occupied by a step ramp structure also swingably supported from the platform for movement between a raised inoperative position and a lowered horizontally outwardly projecting position for contact with and the support from the near side of the associated tank.

Individual means are provided for raising or at least yieldingly biasing each of the extension panels, the step ramp structure and the railing structure toward their raised positions. Accordingly, each may be independently raised against an unexpected ice or snow load thereon far more easily than could be accomplished by simultaneously the extension panels, the step ramp and the railing structure plus the attendant ice or snow loads.

In addition, winch structure is provided for raising and lowering the railing structure of the instant invention, inasmuch as it is furthermost outward from the platform when in the lowered extended position thereof.

The main object of this invention is to provide an access system for the upper portions of tank body equipped vehicles to facilitate access to the central interior tank access structures provided on the tank bodies and to prevent the falling of personnel from the upper portions of such tank bodies.

Another object of this invention is to provide an access system incorporating extension panels, a step ramp and a railing structure each independently supported from an elevated platform and each independently shiftable between extended and retracted positions.

Yet another object of this invention is to provide an access system in accordance with the immediately preceding object whereby the extension panels are swingably supported from the associated platform and partially counterbalanced for swinging toward the retracted positions.

Another important object of this invention is to provide an access system incorporating a step ramp structure which is partially counterbalanced toward a retracted position.

Yet another important object of this invention is to provide a railing structure swingable toward an outward extended position and which includes means for moving the railing structure from the extended position toward a raised inoperative position.

A final object of this invention to be specifically enumerated herein is to provide a mobile tank vehicle access system in accordance with the preceding objects and which will conform to conventional forms of manufacture, be of simple construction and easy to use so as to provide a device that will be economically feasible, longlasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a fragmentary enlarged vertical sectional view taken substantially upon the plate indicated by the section line 5—5 of FIG. 3;

FIG. 6 is a fragmentary enlarged vertical sectional view taken substantially upon the plane indicated by the section line 6—6 of FIG. 3.

DESCRIPTION OF THE PREFERRED EMBODIMENTS

Figure 1:
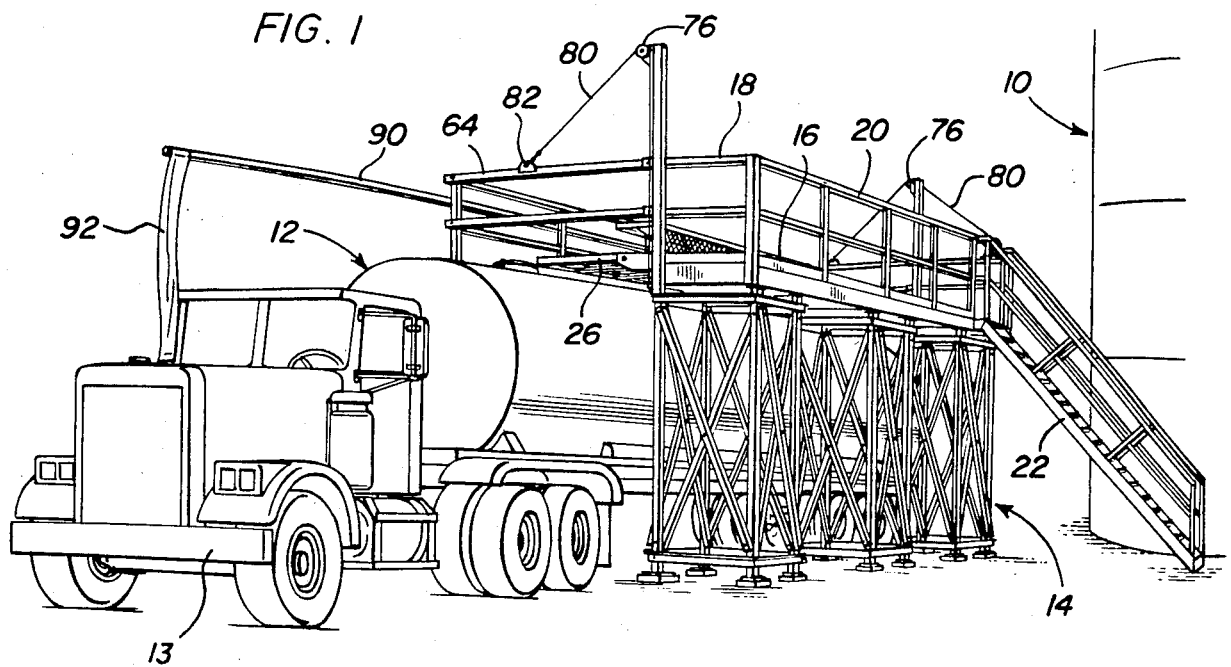
FIG. 1 is a perspective view of the access system of the instant invention in operative association with a semitrailer tank body equipped vehicle.

Referring now more specifically to the drawings the numeral 10 generally designates a stationary storage tank from which quantities of liquids may be drawn and discharged into a tank body equipped vehicle such as that indicated by the reference numeral 12 and comprising a semitrailer having a tractor 13 coupled to its forward end.

The instant invention comprises a mobile tank vehicle access system incorporating a stationary platform assembly referred to in general by the reference numeral 14 and including an upper stationary deck 16 having opposite side railing structures 18 and a front railing structure 20 operatively associated therewith, the front railing structure 20 having an entrance way therein with which the upper end of a railing equipped access stairway 22 is operatively associated.

Figure 2:
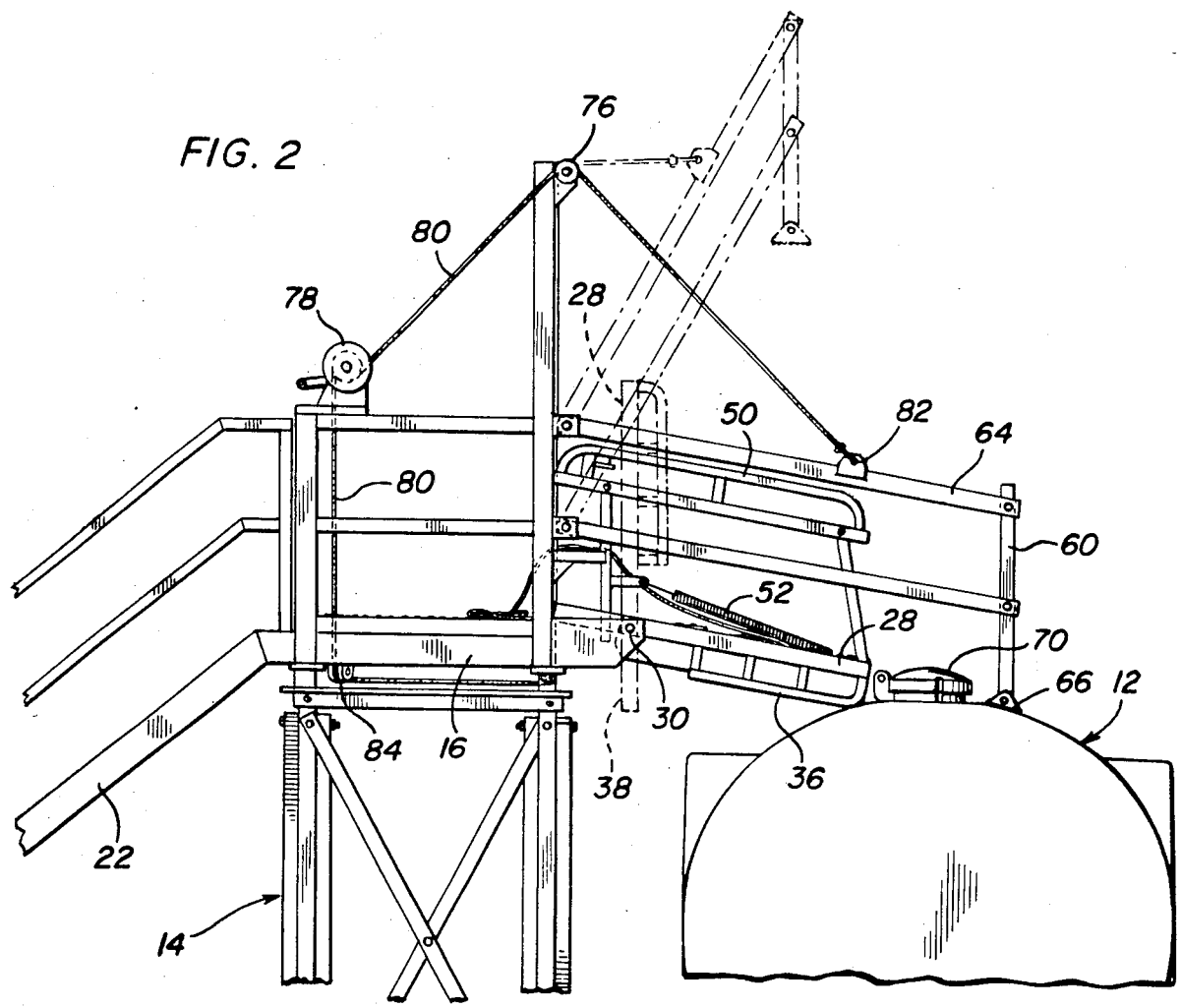
FIG. 2 is a fragmentary enlarged elevational view of the assemblage illustrated in FIG. 1 as seen from the rear of the semitrailer vehicle and with raised positions of the railing and step ramp structure illustrated in phantom lines.

The deck 16 includes a first marginal portion 24 disposed along the rear side thereof remote from the stairway 22 and a pair of extension panels 26 and 28 are spaced apart along the marginal portion 24 and are hingedly supported from the platform assembly 14 as at 30 for swinging between lowered downwardly and outwardly inclined positions such as those illustrated in solid lines in FIG. 2 and raised positions such as those illustrated in phantom lines illustrated in FIG. 2. The extension panels each include a lightweight framework 32 and a cover panel 34 of expanded metal, see FIG. 3, and each extension panel 26, 28 additionally includes a pair of curved runner type gunwale guards 36 extending along and dependingly supported from the opposite marginal edges of the extension panels 26 and 28 extending generally radially of the pivot axis about which the panels are angularly displaceable relative to the deck 16. The undersides of the gunwale guards are cushioned and the inner marginal edges of the extension panels 26 and 28 are provided with counterbalance weights 38 spaced inward of the pivot axis 30. In addition, each of the extension panels 26 and 28 has one end of a pull rope 40 anchored thereto as at 42 whereby each panel portion 26 and 28 may be independently raised from the lowered downwardly and outwardly inclined position thereof merely by exerting an upward pull on the free end of the corresponding rope 40 from the deck 16.

In addition to the extension panels 26 and 28, an elongated narrow step ramp assembly referred to in general by the reference numeral 44 is provided and includes a base end pivotally supported from the deck 16 as at 46 between the inner marginal portions of the adjacent ends of the extension panels 26 and 28. The step ramp 44 includes transverse step treads 48 spaced therealong which are maintained substantially horizontal throughout swinging movement of the step ramp 44 from the downwardly and outwardly inclined extended position illustrated in FIG. 5 to a raised inoperative position. The step ramp structure 44 includes opposite side railing structures 50 and an expansion spring 52 is interconnected between the outer free end of the step ramp 44 and the deck 16 and serves to yieldingly bias the step ramp 44 from the extended position toward an upwardly swung retracted position. Also, the step ramp 44 includes opposite side members 54 whose outer lower corner portions are curved as at 56 to define gunwale guards corresponding to the gunwale guards 36. The gunwale guards of the step ramp 44 are provided with underside cushioning strips 58.

In addition to the extension panels 26 and 28 and of the step ramp 44, the assembly 14 additionally includes an upstanding railing structure 60 supported from remote ends of the deck 16 through the utilization of parallelagram linkages 62 which define end rail structures 64 extending along the remote marginal edges of the extension panels 26 and 28. The railing structure 60 includes dependingly supported cushioned foot members 66 pivotally mounted therefrom as at 68 at points spaced longitudinally along the railing structure 60. Thus, the foot members 66, see FIG. 5, are mounted from the railing structure for oscillation about axes generally parallelling the marginal portion 24. Also, it will be noted that when the railing structure 60 is in the lower operative position illustrated in FIGS. 3 and 5 the railing structure 60 is spaced appreciably outward from free ends of the step ramp 44 and the extension panels 26 and 28. This allows the tank interior access means 70 spaced along the central portion of the top of the tank 12 to be received between the railing structure 60 and the free ends of the step ramp 44 and extension panels 26 and 28.

Figure 4:
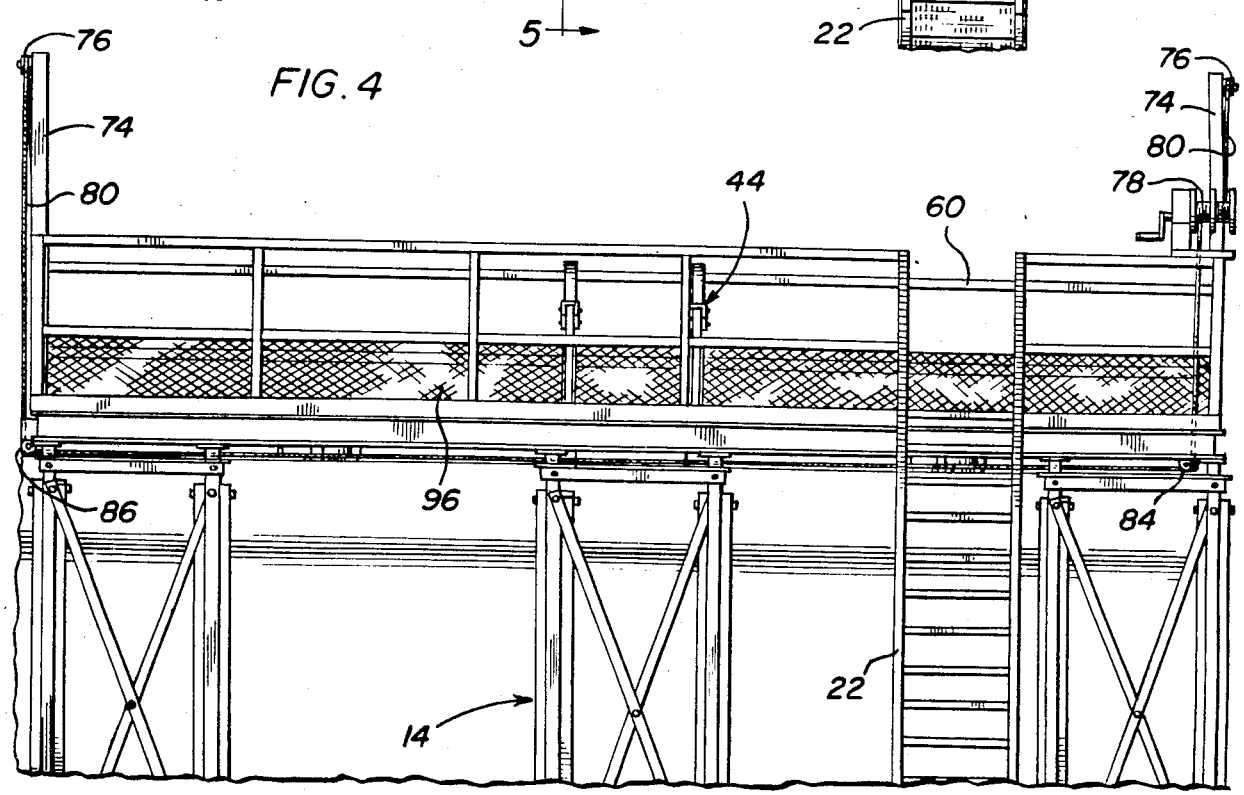
FIG. 4 is a fragmentary elevational view of the front side of the assemblage illustrated in FIG. 3.

With attention now invited more specifically to FIGS. 1 and 2 of the drawings, it may be seen that the opposite ends of the first marginal portion 24 of the deck 16 include upright posts 74 supported therefrom. The upper ends of the post rotatably journal pulleys 76 and a double line winch 78 is mounted on the railing structure 18 at one end of the deck 16 and includes a pair of winch lines or cables 80 operatively associated with the winch and trained over the pulley 76 and attached to the end railing structures 64 as at 82. The winch line or cable 80 extending from the winch 78 over the pulley 76 carried by the remote post 74 is trained beneath the deck 16 by pulleys 84 and 86, see FIGS. 4 and 5.

When it is desired to utilize the access system of the instant invention, after the tank body 12 has been positioned alongside the marginal portion 24, the step ramp 44 is initially lowered to the downwardly and outwardly inclined operative position engaged with the central portion of the nearside of the top of the tank body 12 by pushing downward and outward on either one or both of the side railing structures 50. Once the step ramp 44 has achieved the operative position illustrated in FIG. 5, the mechanical advantage of the expansion springs 52 acting upon the step ramp assembly 44 is diminished and the step ramp 44 will remain in the operative position. Thereafter, downward and outward foot pressure may be applied on the extension panels 26 and 28 in order to swing both panels to the downwardly and outwardly inclined operative positions thereof illustrated in FIG. 6 and the winch 78 may be actuated to gently lower the railing structure 60 into the operative position thereof illustrated in FIG. 5.

Thereafter, when it is desired to raise the step ramp 44, inward and upward pressure may be applied to the opposite side and rails 50 and inward and upward pulls may be exerted on the ropes 40 to swing the step ramp 44 and the extension panels 26 and 28 to their raised inoperative positions. Thereafter, the winch 78 may be actuated to raise the railing structure 60.

Inasmuch as each of the extension panels 26 and 28 is independently raisable and lowerable, the step ramp 44 is independently raisable and lowerable and the railing structure 60 is independently raisable and lowerable, snow and/or ice loads on the outer ends of these structures do not render it impossible to raise these structures from their operative positions to their inoperative positions. Further, the tank body 12 may be of a length which is slightly greater than the combined length of the panels 26 and 28 and the step ramp 44, or a tank body may be only slightly longer than one of the panels 26 and 28 and the step ramp 44. In such instance, only one of the extension panels 26 and the step ramp 44 need be used in conjunction with the railing structure 60. Also, one end of the platform assembly 14 includes an endwise outwardly projecting arm 90 from whose opposite end a flexible depending position indicator 92 is supported, the driver of the tractor 14 being able to utilize the position indicator 92 in order to determine the correct longitudinal positioning of the tank body 12 relative to the platform assembly 14.

Figure 3:
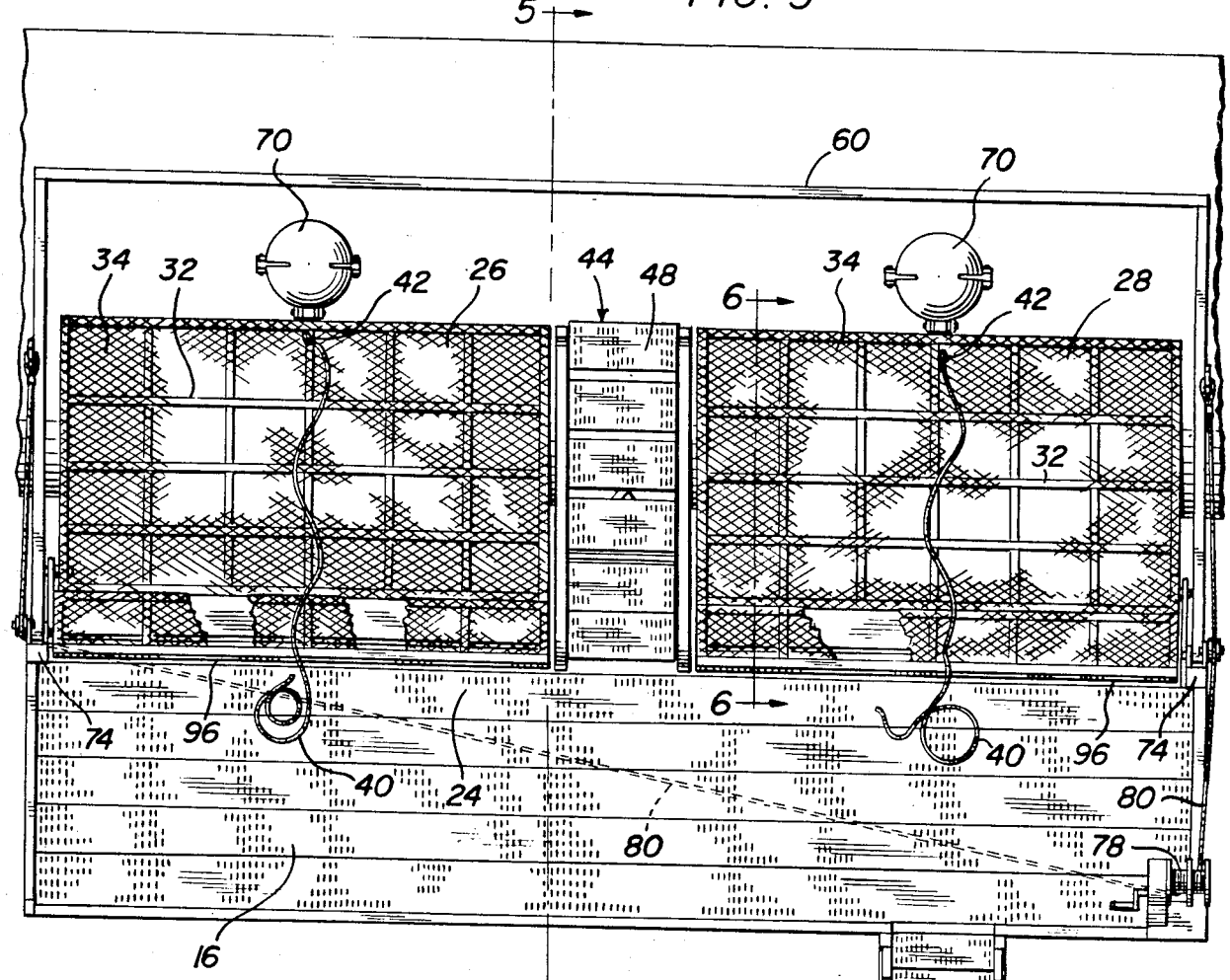
FIG. 3 is a fragmentary enlarged top plan view of the assemblage illustrated in FIG. 2.

From FIGS. 3 and 6 of the drawings it may be seen that the marginal portion 24 includes a lower upstanding fence 96 extending therealong on each end of the marginal portion 24 on opposite sides of the step ramp 44 and that each lower upstanding fence 96 terminates upwardly in a horizontally and outwardly projecting expanded metal safety panel 98 mounted from a suitably braced support frame 100. The lower upstanding fences 96 and safety panels 98 protect against any person disposed on the deck 16 against injury to their feet, legs, arms or hands during swinging movement of the panels 26 and 28 between their raised and lowered positions. When the panels 26 and 28 are pushed outward and downward toward their lower operative positions, the ropes 40 are held so that downward swinging movement of the partially counterbalanced panels 26 and 28 may be limited to positions spaced slightly above the tank body 12. Of course, after these limit positions have been reached, the ropes 40 may be released in order that the under counterbalanced extension panels 26 and 28 may then swing to their final lowered positions resting upon the tank body 12.

It is pointed out that the platform assembly 14 is illustrated in FIG. 1 as a stationary structure. However, the entire assembly 14 could be mounted on wheels and suitably counterbalanced for movement from one tank 10 to another.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A mobile tank vehicle access system including an elevated platform defining one elongated marginal portion, a generally planar extension panel including a base marginal edge pivotally mounted from said marginal portion for angular displacement relative thereto about an axis extending along said marginal portion and base marginal edge between a raised upstanding inoperative poistion and a lowered position extending at least generally horizontally outwardly of said marginal portion, said extension panel including a free marginal edge opposite said base marginal edge for engaging, resing against and extending along the near side of the top of an elongated tank body disposed outward of an generally parallelling said one marginal portion and including central tank interior access means spaced along the tank body disposed at least slightly outward of said free marginal edge, an elongated upstanding railing structure swingably mounted from said platform for movement between a raised upwardly and inwardly retracted position and lowered outwardly extended position relative to said one marginal portion, said railing structure generally parallelling said free marginal edge when said railing structure and a panel are in the lowered poistions thereof and being spaced a distance outward from said free marginal edge sufficient to receive said tank interior access means between said free marginal edge and said railing structure, first means connected between said platform and railing structure for raising and lowering said railing structure independent of raising and lowering said extension panel, a second extension panel corresponding to the first mentioned extension panel and spaced along said one elongated marginal portion from the first mentioned panel, elongated access ramp means including a base end, means pivotally mounting said base end from said one elongated marginal portion between the first mentioned extension panel and said second extension panel for swinging about an axis extending along said one elongated marginal portion and angular displacement of said access ramp means between a raised inoperative position and an outward and downwardly inclined operative position with the free and thereof engaged with and supported from said near side of the top of said tank body, said one elongated marginal portion including a lower upstanding fence projecting upwardly therefrom immediately inwardly of each of said extension panels, each fence terminating upwardly in a horizontally outwardly projecting safety panel.

2. The system of claim 1 wherein said railing structure is swingably mounted from said platform through the utilization of parallel linkage means operative to maintain said railing structure at least generally vertically disposed throughout swinging movement thereof between said raised and lowered positions.

3. The system of claim 1 wherein said extension panel is partially counterbalanced.

4. The system of claim 1 wherein said railing structure includes foot members spaced therealong and dependently supported therefrom for angular displacement about horizontal axis extending longitudinally of said railing structure.

5. The system of claim 1, wherein said elongated access ramp means includes opposite sides longitudinally extending elevated railing means supported therefrom and extending longitudinally therealong.

6. The system of claim 1 including means operatively connected between said access ramp means and the said platform yieldingly biasing said access ramp means toward the raised inoperative position thereof.

7. The system of claim 6 wherein said access ramp means includes self leveling stair treads spaced longitudinally therealong.

8. The system of claim 7 wherein said extension panels are independently partially counterbalanced.

9. The system of claim 8 wherein said railing structure is swingably mounted from said platform through the utilization of parallel linkage means operative to maintain said railing structure at least generally vertically disposed throughout swinging movement thereof between said raised and lowered positions.

10. The system of claim 9 wherein said railing structure includes foot members spaced therealong and dependently supported therefrom for angular displacement about horizontal axis extending longitudinally of said railing structure.

11. A mobile tank vehicle access system including an elevated platform defining one elongated marginal portion, a generally planar extension panel including a base marginal edge pivotally mounted from said marginal portion for angular displacement relative thereto about an axis extending along said marginal portion and base marginal edge between a raised upstanding inoperative position and a lowered position extending at least generally horizontally outwardly of said marginal portion, said extension panel including a free marginal edge opposite said base marginal edge for engaging, resting against and extending along the near side of the top of an elongated tank body disposed outward of an generally parallelling said one marginal portion and including central tank interior access means spaced along the tank body disposed at least slightly outward of said free marginal edge, an elongated upstanding railing structure swingably mounted from said platform for movement between a raised upwardly and inwardly retracted position and lowered outwardly extended position relative to said one marginal portion, said railing structure generally parallelling said free marginal edge when said railing structure and a panel are in the lowered positions thereof and being spaced a distance outward from said free marginal edge sufficient to receive said tank interior access means between said free marginal edge and said railing structure, first means connected between said platform and railing structure for raising and lowering said railing structure independent of raising and lowering said extension panel, said one elongated marginal portion including a lower upstanding fence projecting upwardly therefrom immediately inwardly of said extension panel and terminating upwardly in a horizontally outwardly projecting safety panel spaced above the base marginal edge of said extension panel.

* * * * *